United States Patent
Basten

(10) Patent No.: US 6,411,883 B1
(45) Date of Patent: Jun. 25, 2002

(54) VEHICLE CRUISE CONTROL WITH AUTOMATIC SET SPEED REDUCTION

(75) Inventor: Mark Jonathan Basten, Halesowen (GB)

(73) Assignee: Lucas Industries Limited, Solihull (GB)

(*) Notice: Subject to any disclaimer, the term of this patent is extended or adjusted under 35 U.S.C. 154(b) by 0 days.

(21) Appl. No.: 09/744,530
(22) PCT Filed: Jul. 20, 1999
(86) PCT No.: PCT/GB99/02346
§ 371 (c)(1),
(2), (4) Date: Jan. 25, 2001
(87) PCT Pub. No.: WO00/06411
PCT Pub. Date: Feb. 10, 2000

(30) Foreign Application Priority Data
Jul. 29, 1998 (GB) .............................................. 9816521

(51) Int. Cl.⁷ ................................................ B60T 8/32
(52) U.S. Cl. ............................. 701/93; 701/96; 701/301; 180/169
(58) Field of Search ............................ 701/93, 96, 301, 701/300, 98; 180/167–178; 123/350, 352; 342/109, 454, 455; 340/901–904

(56) References Cited

U.S. PATENT DOCUMENTS

| | | | | |
|---|---|---|---|---|
| 5,901,806 A | * | 5/1999 | Takahashi | 180/170 |
| 6,185,499 B1 | * | 2/2001 | Kinoshita et al. | 701/96 |
| 6,259,395 B1 | * | 7/2001 | Adachi et al. | 340/903 |
| 6,297,737 B1 | * | 9/2001 | Higashimata et al. | 701/96 |

* cited by examiner

Primary Examiner—Richard M. Camby
(74) Attorney, Agent, or Firm—Reising, Ethington, Barnes, Kisselle, Learman and McCulloch, PC

(57) ABSTRACT

A cruise controller (2) with a set speed and/or acceleration limit reduction facility is provided. If the controlled vehicle becomes slowed due to the presence of a slower moving vehicle in front of it, the set speed and/or acceleration limit is reduced in order to prevent rapid acceleration from occurring if the target vehicle suddenly moves out of the way.

21 Claims, 1 Drawing Sheet

VEHICLE CRUISE CONTROL WITH AUTOMATIC SET SPEED REDUCTION

Figure 1:
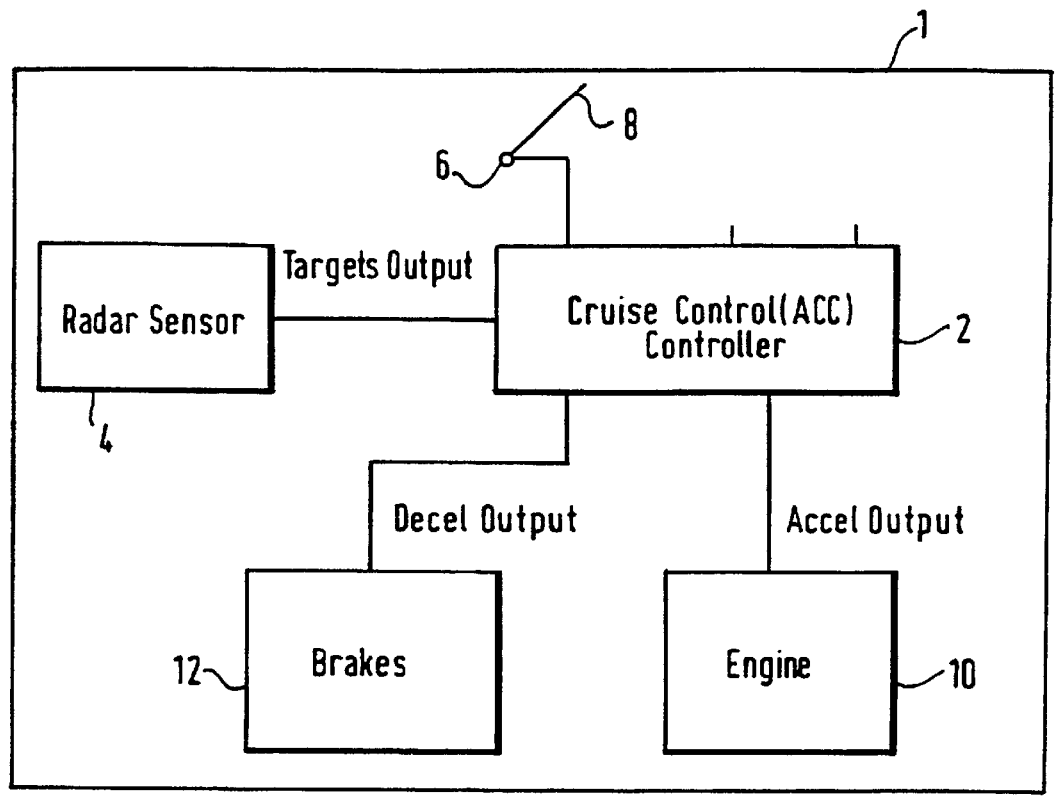

The present invention relates to a vehicle cruise control system incorporating a facility to automatically reduce the set speed of the controlled vehicle. The set speed represents an adjustable speed which is the speed the controller will attempt to keep the vehicle at.

Vehicle cruise controllers are becoming increasingly sophisticated. Known controllers, such as that described in EP0612641A incorporate a radar detector in order to identify the distance to and relative speed of a vehicle travelling in front (hereinafter the target vehicle) of the controlled vehicle. If the target vehicle is travelling faster than the set speed of the controlled vehicle, then the controlled vehicle continues at its set speed. However, if the target vehicle is travelling slower than the set speed, the controlled vehicle reduces its own speed to maintain a desired range behind the target vehicle. This reduces the need for frequent driver intervention to maintain a safe distance behind other vehicles. EP 0716149 discloses a further development in which the cruise control system monitors multiple target vehicles, both directly ahead of the controlled vehicle and to lanes either side of the controlled vehicle in order to ensure that the controlled vehicle does not perform an illegal overtaking manoeuvre.

The highly advanced cruise control systems as described hereinabove are predominantly fitted to luxury and high performance vehicles capable of rapid acceleration. The applicant has realised that there are circumstances in which it is desirable to reduce the set speed or a maximum acceleration limit. Such a circumstance may arise in heavy traffic, at traffic lights or queuing for road works when the controlled vehicle may travel slowly or come to a complete stop. Under such circumstances the driver's attention may become directed elsewhere, and if the target vehicle moves out of a path of the controlled vehicle, the controlled vehicle may accelerate rapidly in order to attain the set speed. This could be disconcerting and possibly dangerous.

According to a first aspect of the present invention, there is provided a cruise controller having a value reducing means for reducing at least one of the set speed and acceleration limit when the cruise controller is controlling the controlled vehicle's speed to maintain a predetermined distance behind a target vehicle travelling slower than the set speed of the controlled vehicle.

It is thus possible to provide a cruise controller which automatically reduces the controlled vehicle's set speed and/or maximum acceleration limit when the speed of the controlled vehicle becomes constrained by a slower moving target vehicle. Thus, if the target vehicle subsequently moves out of a path of the controlled vehicle, the controlled vehicle will no longer accelerate so rapidly, thereby giving the driver time to adjust to the change of circumstance.

Preferably the set speed or maximum acceleration may be reduced to zero if the controlled vehicle comes to a halt. The driver is then required to signal to the cruise controller that he wishes cruise control to be resumed. A switch or some other driver operated control may be provided. Preferably, the position of the accelerator pedal is monitored such that movement of the pedal by the driver is taken to indicate that cruise control should be resumed. Use of the accelerator pedal in this manner feels natural to the driver.

Preferably the controlled vehicle's speed is compared with the set speed and the value reduction is implemented when the magnitude of the speed difference exceeds a predetermined speed difference. The predetermined speed difference may be a set value or may be derived as a function of the set speed.

Preferably the set speed is reduced by a predetermined amount when the difference between the vehicle's speed and the set speed exceeds the predetermined speed difference for more than a predetermined period of time. The time period and step size of the set speed reduction can be freely chosen, and may be selected such that a continuously varying function of set speed with respect to time can be simulated. Additionally or alternatively the maximum allowed acceleration can be varied in a similar manner.

Preferably the vehicle's acceleration limit is reduced if the difference between the vehicle's speed and the set speed exceeds a second predetermined speed difference. The second predetermined speed difference may be equal to the first predetermined speed difference. However, the first and second predetermined speed differences may be set to different values, such that the maximum acceleration threshold may be reduced before a reduction occurs in the set speed, or vice versa.

It is thus possible to provide an adaptive cruise controller for controlling a speed of a vehicle, wherein the cruise controller is responsive to data representing the vehicle speed and at least the distance to a first target vehicle ahead of the controlled vehicle, and wherein the cruise controller operates to maintain the controlled vehicle's speed below a selectable maximum speed in the event that the first target vehicle is travelling below the selectable maximum speed, and to maintain a predetermined distance behind the first target vehicle, characterised in that when the controlled vehicle is travelling behind the first target vehicle at a speed which is slower than the selectable maximum speed, at least one of the selectable maximum speed and maximum acceleration rate is reduced:

According to a second aspect of the present invention, there is provided a method of controlling the speed of a vehicle fitted with a cruise control system arranged to follow a target vehicle at a predetermined distance when the target vehicle is travelling slower than a set speed, the method comprising the step of reducing at least one of the set speed and a maximum acceleration value when the vehicle speed is constrained to be less than the set speed because of the presence of a target vehicle travelling at less than the set speed.

According to a third aspect of the present invention there is provided a computer program product for causing a data processor within a cruise controller to implement the method according to the second aspect of the present invention.

Figure 2:
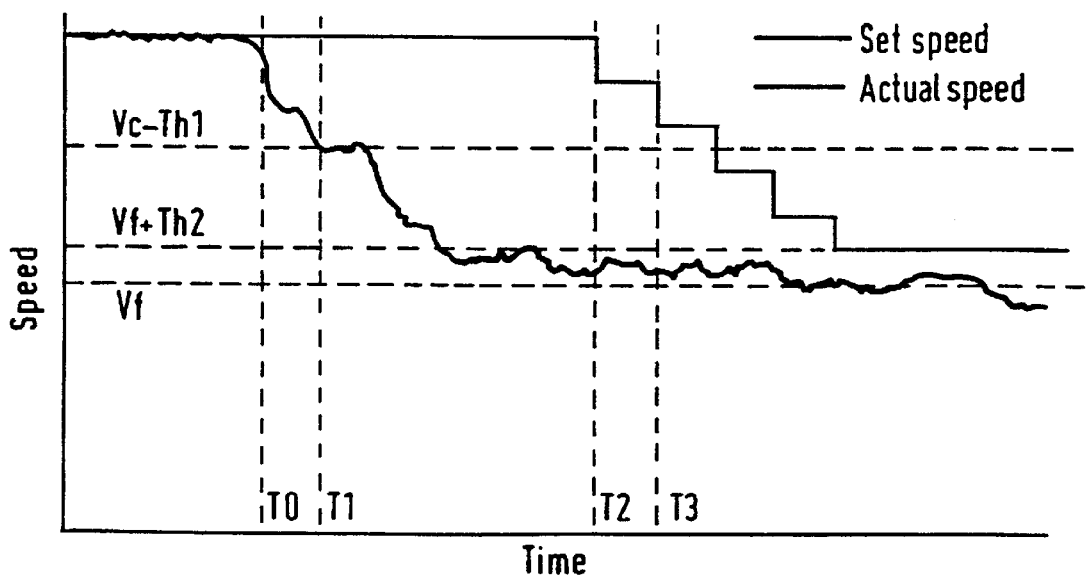

The present invention will further be described, by way of example, with the reference to the accompanying drawing in which;

FIG. 1 is a schematic diagram of a cruise control system constituting an embodiment of the present invention; and FIG. 2 is a graph illustrating the modification of the set speed in response to the actual speed of a controlled vehicle.

As shown in FIG. 1, a vehicle generally indicated 1 is provided with an adaptive cruise controller 2 which is responsive to a remote object detection device such as a radar sensor 4 which provides data indicative of the speed and distance to a plurality of target vehicles ahead of the controlled vehicle. The cruise controller 2 also receives data from a sensor 6 monitoring the position of the vehicle accelerator pedal 8. The cruise controller 2 also receives data relating to the set speed desired by the driver and may also receive data relating to the size of the gap which the driver wishes the controlled vehicle to leave between itself and the target vehicle via data entry means (not shown). Based on this information together with information concerning the speed of the controlled vehicle, the cruise controller 2 generates control signals for controlling the operation of the vehicle engine 10 and the vehicle brakes 12.

In use, the data from the radar sensor 4 is analysed by the cruise controller to determine whether or not a target vehicle is ahead of the controlled vehicle and sufficiently close to the controlled vehicle such that the speed of the vehicle has to be controlled in response to the speed of the target vehicle. If there is no target vehicle, or it is sufficiently far away, the cruise controller maintains the controlled vehicle at the set speed. However, if the controlled vehicle approaches a target vehicle from behind then the cruise controller 2 decelerates the controlled vehicle in order to maintain the controlled vehicle at a safe distance behind the target vehicle, as disclosed in the prior art.

FIG. 2 is a graph representing the speed of a controlled vehicle with respect at the time. In the time period preceding T0, the controlled vehicle's speed matches the set speed, Vc, because there is no target vehicle sufficiently close to the controlled vehicle. The controlled vehicle approaches a slower moving target vehicle at time at T0 and consequently the actual speed drops below the set speed in order to prevent the controlled vehicle from shunting the target vehicle from behind. At time T1 the difference between the set speed and the controlled vehicle's actual speed exceeds a first predetermined threshold Th1 and this causes and internal timer to be started. In the event that the controlled vehicle's speed increases again such that the speed exceeds the set speed minus Th1, then the internal timer will be reset. The threshold Th1 is typically 20 $kmh_{-1}$, although it may be a variable threshold set, for example, to approximately 70% of the set speed. In this example, the timer times out at T2 and the vehicle speed has remained below Vc minus Th1. As a result, the set speed is reduced by a predetermined amount, for example 10 $km_{-1}$ to form a new value of set speed Vc' for cruise control operation. The period T2 minus T1 may, for example, be set equal to 1 minute. If, after a further period of time, for example 45 seconds, denoted by time T3, the vehicle speed is still below the new set speed Vc' by more than the threshold Th1, the set speed is reduced yet again to form a new set speed value. Further decrements of the set speed will continue until such time as the cruise control system is disabled, the vehicle speed rises above Vc' minus Th1, where Vc' represents the current value of the set speed, or the set speed is reduced to a value of less that Vf plus Th2 where Vf represents the speed of the target vehicle and Th2 is a further predetermined threshold, for example having a value of 20 $kmh_{-1}$. The value of the Vf used may be instantaneous value of the target vehicle or may be time averaged value formed over a relatively short time window.

When the target vehicle moves away or is no longer in the path of the controlled vehicle the original set speed Vc has now been overwritten by the new lower set speed Vc' and the vehicle will gently accelerate to that new lower set speed until such time as the driver intervenes to accelerate manually. When the driver intervenes the new set speed Vc' is overwritten by a record of the original set speed Vc.

In a modification of the above described operation, the driver set speed may be left at the chosen level but an acceleration limit threshold may be reduced in accordance with a regime similar to that described above such that the maximum acceleration rate becomes limited after a period of following a slower moving target vehicle.

The result of the operation of the system is that, subsequent to an extended period of slow speed travel involving following a slow moving target vehicle, the vehicle speed will then increase relatively slowly towards the new set speed, or previous set speed, as appropriate, This gives the driver opportunity to adjust to the varying driving conditions and prevents the vehicle from undergoing unexpected rapid acceleration.

A special case arises where the controlled vehicle comes completely to a rest, as may occur in heavy traffic. Under such circumstances, particularly if the stop becomes prolonged, the driver may cease to a pay full attention to the carriage way and may start to perform other tasks, such as map reading, talking to a passenger or selecting new music on an in-car entertainment system, under such circumstances, it could be dangerous if the vehicle were to suddenly accelerate while the driver was not paying attention. In order to avoid this, the maximum acceleration threshold or the set speed Vc' may be set to zero when the vehicle comes to a halt. In order to resume cruise control, the driver must manually intervene. An intuitive form of intervention is to require the driver to operate the accelerator pedal 8 whose motion is monitored by a sensor 6. Once the cruise controller 2 detects that the pedal 8 has been depressed by the driver, the value of the set speed or the maximum acceleration threshold can be returned to their previous value, thereby enabling the vehicle to move off.

It is thus possible to provide a cruise control system which takes account of slow moving traffic and reduces the maximum vehicle speed or acceleration accordingly in order that the driver is given time to get used to the changing traffic conditions once the traffic starts to move more freely again.

I claim:

1. A cruise controller having a value reducing device for reducing a set speed when the cruise controller is controlling a controlled vehicle's speed to maintain a predetermined distance behind a target vehicle travelling slower than the set speed of the controlled vehicle, and in which the set speed is reduced to zero if the controlled vehicle comes to a halt, and following which the cruise controller is responsive to the position of a vehicle accelerator pedal and uses motion of the pedal as an indication from the driver that cruise control is to be resumed.

2. A cruise controller as claimed in claim 1, in which the value reducing device can also reduce an acceleration limit and the acceleration limit is reduced to zero if the controlled vehicle comes to a halt.

3. A cruise controller as claimed in claim 1, in which the cruise controller is arranged to compare the controlled vehicle's speed with the set speed and to reduce at least one of the set speed and an acceleration limit when a difference between the controlled vehicle's speed and the set speed exceeds a predetermined speed difference.

4. A cruise controller as claimed in claim 3, in which the predetermined speed difference is a function of the set speed.

5. A cruise controller as claimed in claim 3, in which the set speed is reduced to a reduced set speed when the predetermined speed difference has been exceeded for an predetermined time period.

6. A cruise controller as claimed in claim 5, in which the predetermined time period is a function of set speed.

7. A cruise controller as claimed in claim 1, in which a size of a reduction of the set speed is a function of the set speed.

8. A cruise controller as claimed in claim 1, in which the vehicle's set speed is reduced if a difference between the vehicle's speed and the set speed exceeds a first predetermined threshold and the vehicle's acceleration limit is reduced if the difference exceeds a second predetermined threshold.

9. A cruise controller as claimed in claim 1, in which the set speed is stored such that it can be restored upon a driver's command thereby replacing reduced values of set speed or acceleration.

10. A vehicle characterised by including a cruise controller as claimed in claim 1.

11. A method of controlling a vehicle fitted with a cruise control system arranged to follow a target vehicle at a predetermined distance when the target vehicle is travelling slower than a set speed of the controlled vehicle, and in which the set speed is reduced to zero if the controlled vehicle comes to a halt, and in which the cruise controller then awaits a driver signal provided via motion of a vehicle accelerator pedal before recommencing cruise control.

12. A computer program product for causing a data processor within a cruise controller to implement the method of claim 11.

13. A cruise controller having a value reducing device for reducing an acceleration limit when the cruise controller is controlling a controlled vehicle's speed to maintain a predetermined distance behind a target vehicle travelling slower than a set speed of the controlled vehicle, and in which acceleration limit is reduced to zero if the controlled vehicle comes to a halt, and following this the cruise controller monitors the position of an accelerator pedal and uses motion of the accelerator pedal as a indication from the driver that cruise control is to be resumed.

14. A cruise controller as claimed in claim 13, in which the cruise controller is arranged to compare the controlled vehicle's speed with the set speed and to reduce the acceleration limit when a difference between the controlled vehicle's speed and the set speed exceeds a predetermined speed difference.

15. A cruise controller as claimed in claim 14, in which the predetermined speed difference is a function of the set speed.

16. A cruise controller as claimed in claim 13, in which a size of a reduction of the acceleration limit is a function of the set speed.

17. A cruise controller as claimed in claim 13, in which the value reducing device reduces the vehicle's set speed if a difference between the vehicle's speed and the set speed exceeds a first predetermined threshold and the vehicle's acceleration limit is reduced if the difference exceeds a second predetermined threshold.

18. A cruise controller as claimed in claim 13, in which the acceleration limit is stored such that it can be restored upon a driver's command thereby replacing reduced values of set speed or acceleration.

19. A vehicle characterized by including a cruise controller as claimed in claim 13.

20. A method of controlling the speed of a vehicle fitted with a cruise control system arranged to follow a target vehicle at a predetermined distance when the target vehicle is travelling slower than a set speed, the method comprising reducing a maximum acceleration value when the vehicle speed is constrained by the presence of a target vehicle travelling at less than the set speed, and in which the maximum acceleration value is reduced to zero if the vehicle comes to a halt, and the cruise controller waits for the driver to move a vehicle accelerator pedal before resuming cruise control.

21. A computer program product for causing a data processor within a cruise controller to implement the method of claim 20.

* * * * *